US012681299B2

(12) United States Patent     (10) Patent No.:   US 12,681,299 B2

Noguchi et al.     (45) Date of Patent:     Jul. 14, 2026

---

(54) HEAD-UP DISPLAY DEVICE

(71) Applicant: NIPPON SEIKI CO., LTD., Niigata (JP)

(72) Inventors: Ken Noguchi, Niigata (JP); Masao Satoh, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 393 days.

(21) Appl. No.: 18/248,460

(22) PCT Filed: Oct. 19, 2021

(86) PCT No.: PCT/JP2021/038519

§ 371 (c)(1),
(2) Date: Apr. 10, 2023

(87) PCT Pub. No.: WO2022/091855

PCT Pub. Date: May 5, 2022

(65) Prior Publication Data

US 2023/0408813 A1     Dec. 21, 2023

(30) Foreign Application Priority Data

Oct. 26, 2020    (JP) ................................. 2020-178509

(51) Int. Cl.
   *G02B 27/01*      (2006.01)
   *B60K 35/231*     (2024.01)
   *G02B 7/182*      (2021.01)

(52) U.S. Cl.
   CPC ........ *G02B 27/0101* (2013.01); *B60K 35/231* (2024.01); *G02B 7/182* (2013.01); *G02B 27/0149* (2013.01); *G02B 2027/015* (2013.01)

(58) Field of Classification Search
   CPC .... B60R 2011/0085; B60R 2011/0092; G02B 27/0101; G02B 7/182; G02B 27/0149;

(Continued)

(56) References Cited

U.S. PATENT DOCUMENTS

2015/0286054 A1    10/2015   Ushida et al.
2019/0033590 A1*   1/2019   Kasahara ................ G06F 3/147

(Continued)

FOREIGN PATENT DOCUMENTS

EP        3683615 A1 *   7/2020   ......... G02B 27/0149
JP        2014-85539 A    5/2014

(Continued)

OTHER PUBLICATIONS

International Search Report issued in corresponding International Application No. PCT/JP2021/038519, dated Jan. 11, 2022, w/ English Translation (6 pages).

*Primary Examiner* — Thomas K Pham
*Assistant Examiner* — Ruby L Kauffman
(74) *Attorney, Agent, or Firm* — Rimon P.C.

(57) ABSTRACT

The purpose of the present invention is to provide a head-up display device that enables a reduction in size. A head-up display device according to the present invention comprises: a display unit that emits display light; a first mirror that reflects the display light from the display unit; a second mirror that reflects the display light reflected by the first mirror; and a mirror driving unit that rotates the first mirror about a rotation axis.

8 Claims, 11 Drawing Sheets

(58) Field of Classification Search
CPC .............. G02B 2027/015; G02B 27/01; G02B
2027/0154; B60K 35/231; B60K 2360/23;
B60K 2360/96; B60K 35/23–235
See application file for complete search history.

(56) References Cited

U.S. PATENT DOCUMENTS

| | | | | |
|---|---|---|---|---|
| 2019/0129172 A1* | 5/2019 | Misawa | ............. | H05K 7/20336 |
| 2019/0219823 A1* | 7/2019 | Henon | ............... | G02B 27/0101 |

FOREIGN PATENT DOCUMENTS

| | | | | |
|---|---|---|---|---|
| JP | 2015-87698 A | | 5/2015 | |
| JP | 2019-139128 A | | 8/2019 | |
| KR | 20210085565 A | * | 7/2021 | ............. F16H 25/20 |
| WO | 2017/130763 A1 | | 8/2017 | |

* cited by examiner

HEAD-UP DISPLAY DEVICE

CROSS REFERENCE TO RELATED APPLICATIONS

This application is the U.S. National Phase under 35 U.S.C. § 371 of International Application No. PCT/JP2021/038519, filed on Oct. 19, 2021, which claims the benefit of Japanese Application No. 2020-178509, filed on Oct. 26, 2020, the entire contents of each are hereby incorporated by reference.

TECHNICAL FIELD

The present disclosure relates to a head-up display device.

BACKGROUND ART

For example, a head-up display device described in Patent Document 1 includes a display unit that emits display light, a folded mirror member that reflects the display light emitted from the display unit, a mirror unit that reflects the display light reflected at the folded mirror member toward a windshield, and a mirror driving unit that rotates the mirror unit.

PRIOR ART DOCUMENT

Patent Document

Patent Document 1: Japanese Unexamined Patent Application Publication No. 2019-139128

SUMMARY OF THE INVENTION

Problems to be Solved by the Invention

In a configuration described in Patent Document 1 described above, the display light emitted from the display unit is expanded through the folded mirror member and the mirror unit, and therefore, there is a probability that a size of the mirror unit located on a rear side in a light path of the display light is increased and, accordingly, a size of the mirror driving unit and, furthermore, a size of the head-up display device are increased.

In view of the actual situation as described above, the present disclosure has been devised and it is an object of the present disclosure is to provide a head-up display device that enables reduction in size.

Solution to Problem

In order to achieve the above-mentioned purpose, a head-up display device according to the present disclosure includes a display unit that emits display light, a first mirror that reflects the display light from the display unit, a second mirror that reflects the display light reflected at the first mirror, and a mirror driving unit that rotates the first mirror around a rotation axis.

Effect of the Invention

According to the present disclosure, reduction in size of a head-up display device can be achieved.

MODE FOR CARRYING OUT THE INVENTION

One embodiment of a head-up display device according to the present disclosure will be described with reference to the accompanying drawings.

Figure 1:
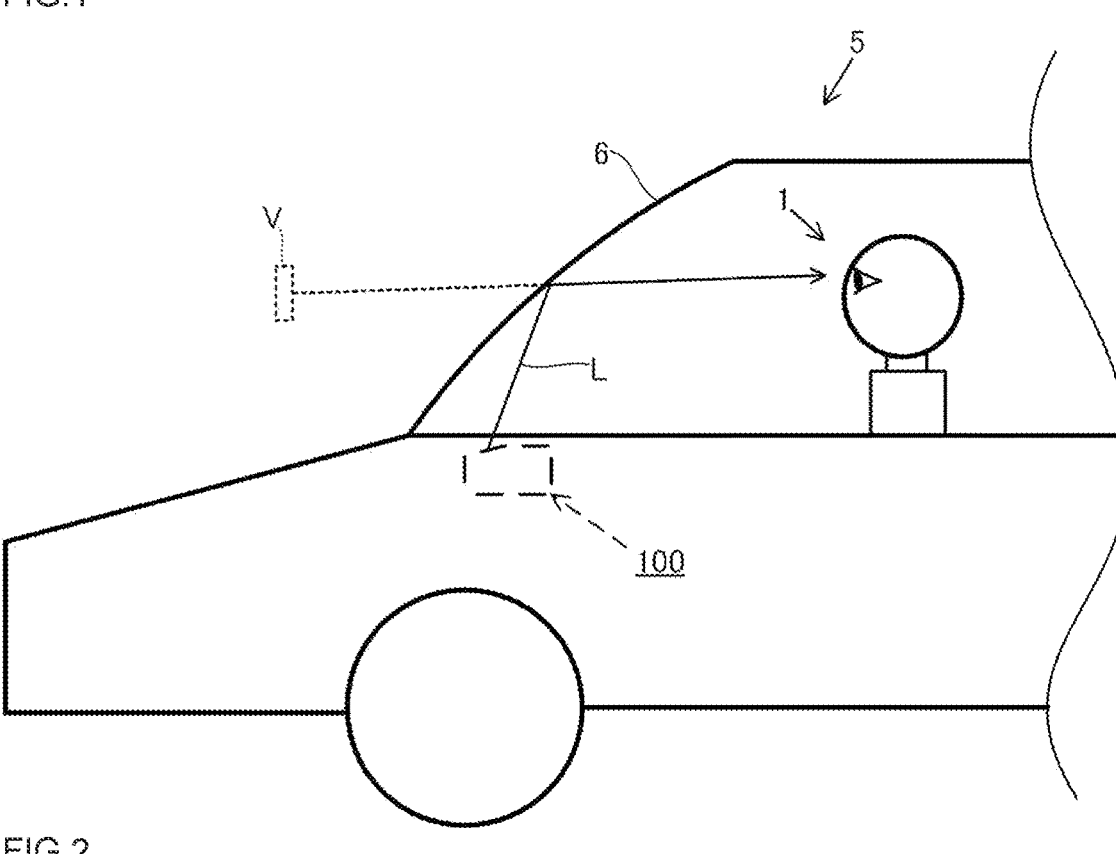
FIG. 1 is a schematic diagram of a vehicle in which a head-up display device according to one embodiment of the present disclosure is mounted.

As illustrated in FIG. 1, a head-up display device 100 is mounted in a dashboard of a vehicle 5. The head-up display device 100 emits display light L representing an image toward a windshield 6 that is an example of a projection target member of the vehicle 5. The display light L is reflected by the windshield 6 and reaches a viewer 1 (mainly a driver of the vehicle 5). Thus, the head-up display device 100 displays a virtual image V including vehicle information that can be viewed by the viewer 1.

Figure 2:
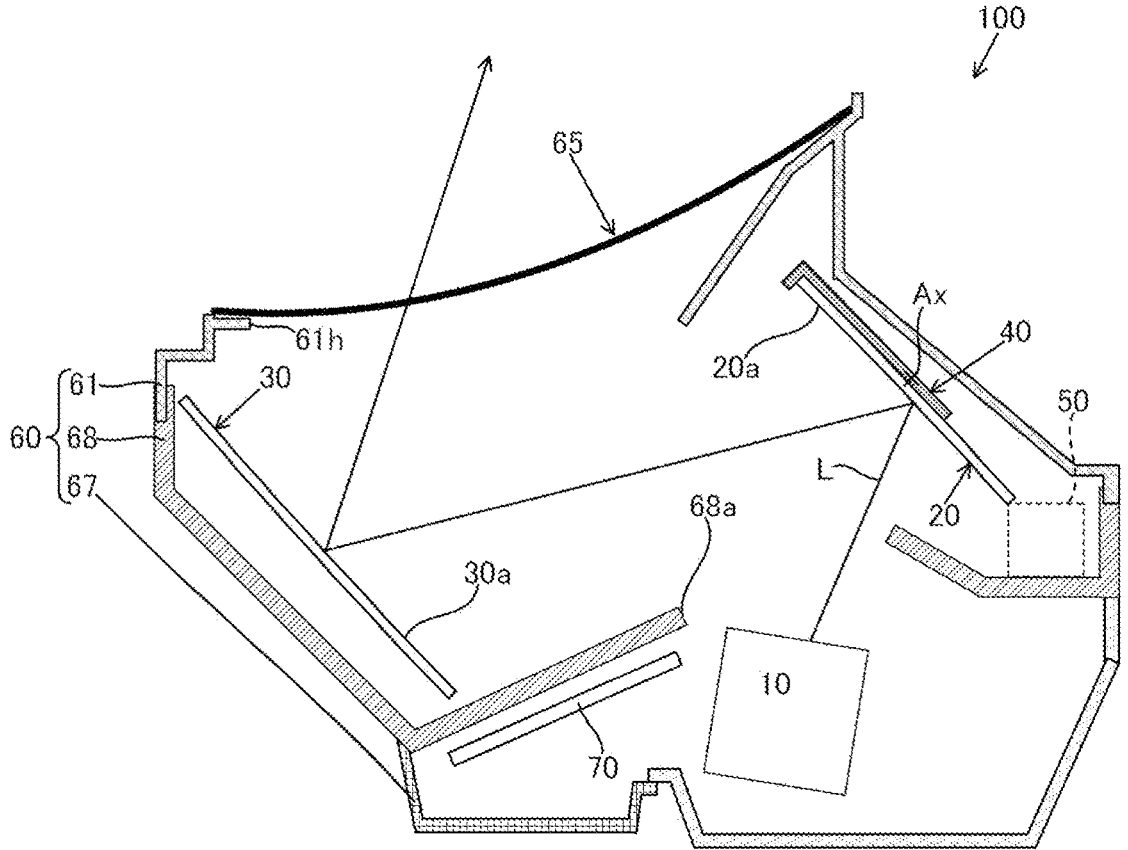
FIG. 2 is a schematic cross-sectional view of a head-up display device according to one embodiment of the present disclosure.
Figure 3:
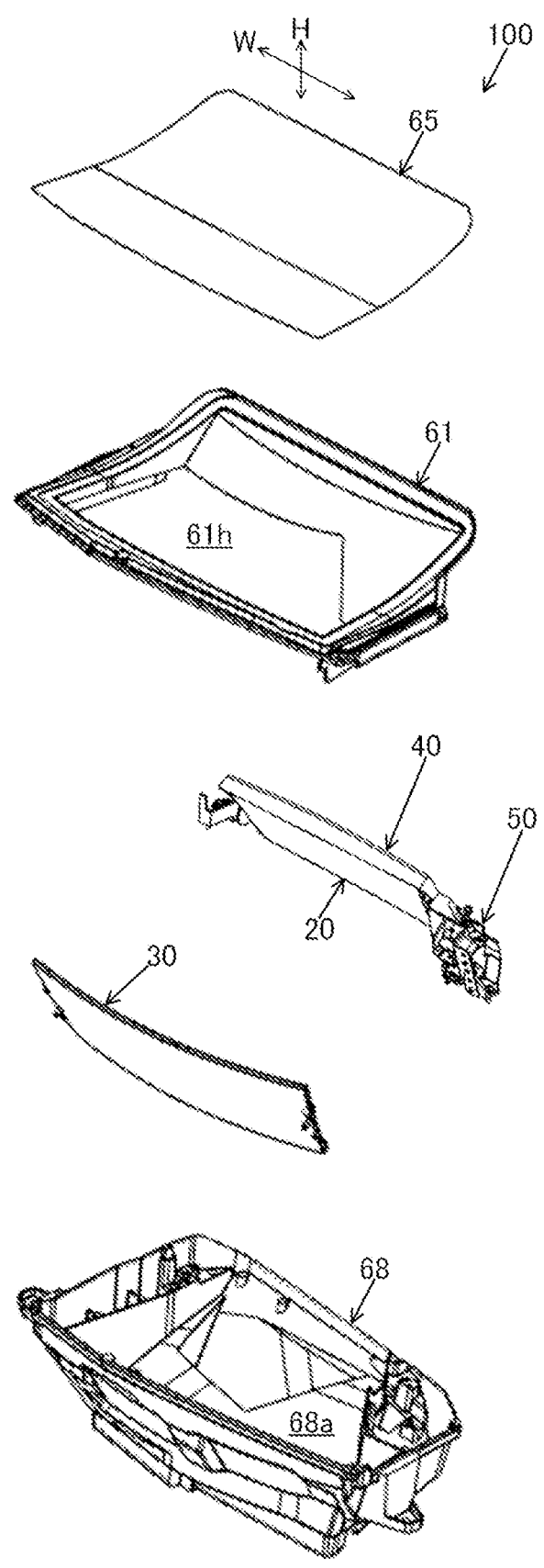
FIG. 3 is an exploded perspective view of a head-up display device according to one embodiment of the present disclosure.

As illustrated in FIG. 2 and FIG. 3, the head-up display device 100 includes a display unit 10, a first mirror 20, a mirror holder unit 40, a second mirror 30, a housing 60, a mirror driving unit 50, and a control board 70.

As illustrated in FIG. 2, the display unit 10 emits the display light L representing an image under control by the control board 70. The display unit 10 includes, for example, a thin film transistor (TFT) type liquid crystal display panel (not illustrated) and a backlight (not illustrated) that illuminates the liquid crystal display panel.

Figure 4:
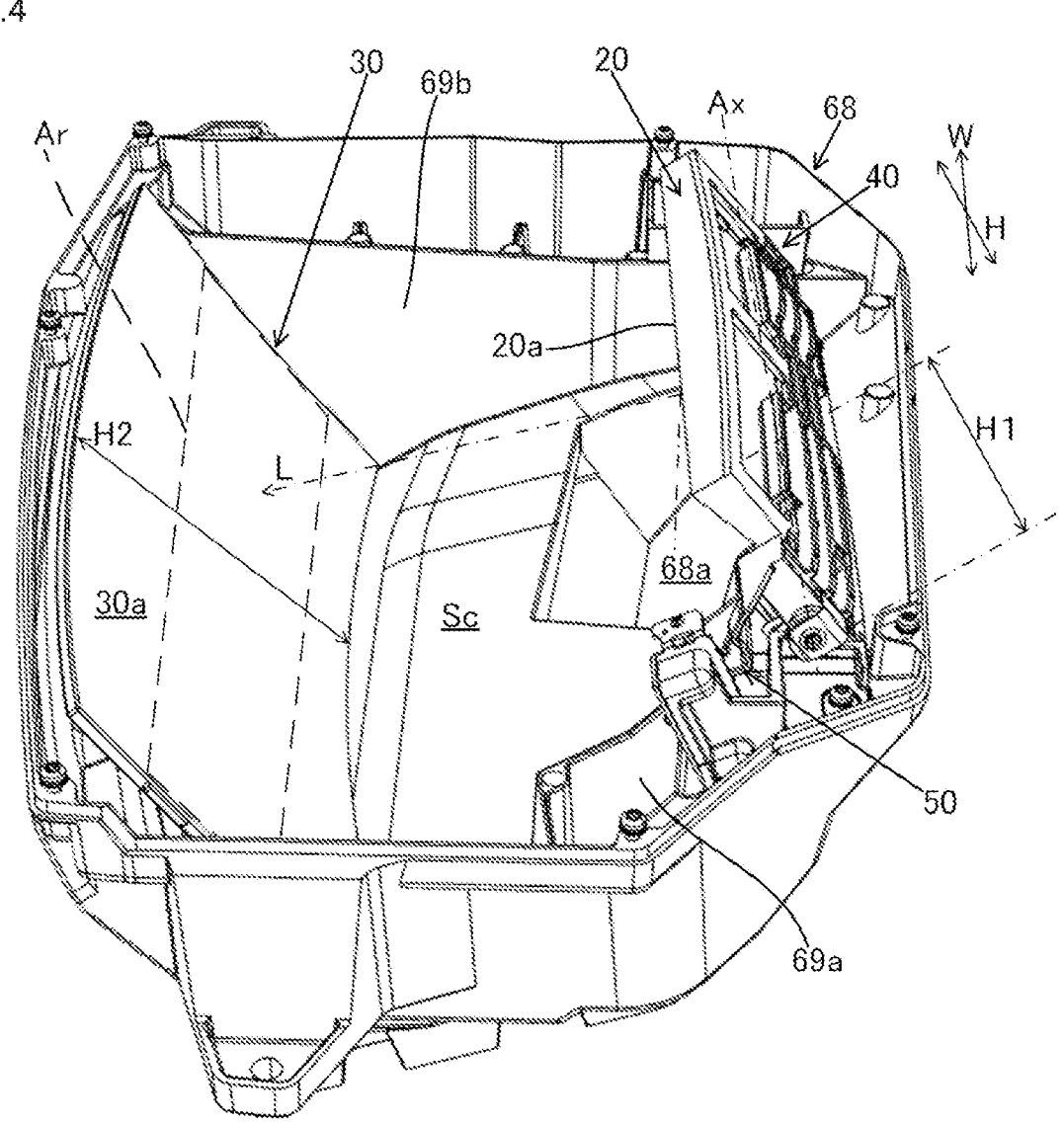
FIG. 4 is a perspective view of a head-up display device according to one embodiment of the present disclosure with an upper case removed.

As illustrated in FIG. 4, the first mirror 20 is a concave mirror concavely curved in a width direction W along a rotation axis Ax of the first mirror 20. The first mirror 20 reflects the display light L from the display unit 10 toward the second mirror 30. In this example, the first mirror 20 reflects the display light L emitted from the display unit 10 and upwardly traveling downward toward front of the vehicle.

Figure 5:
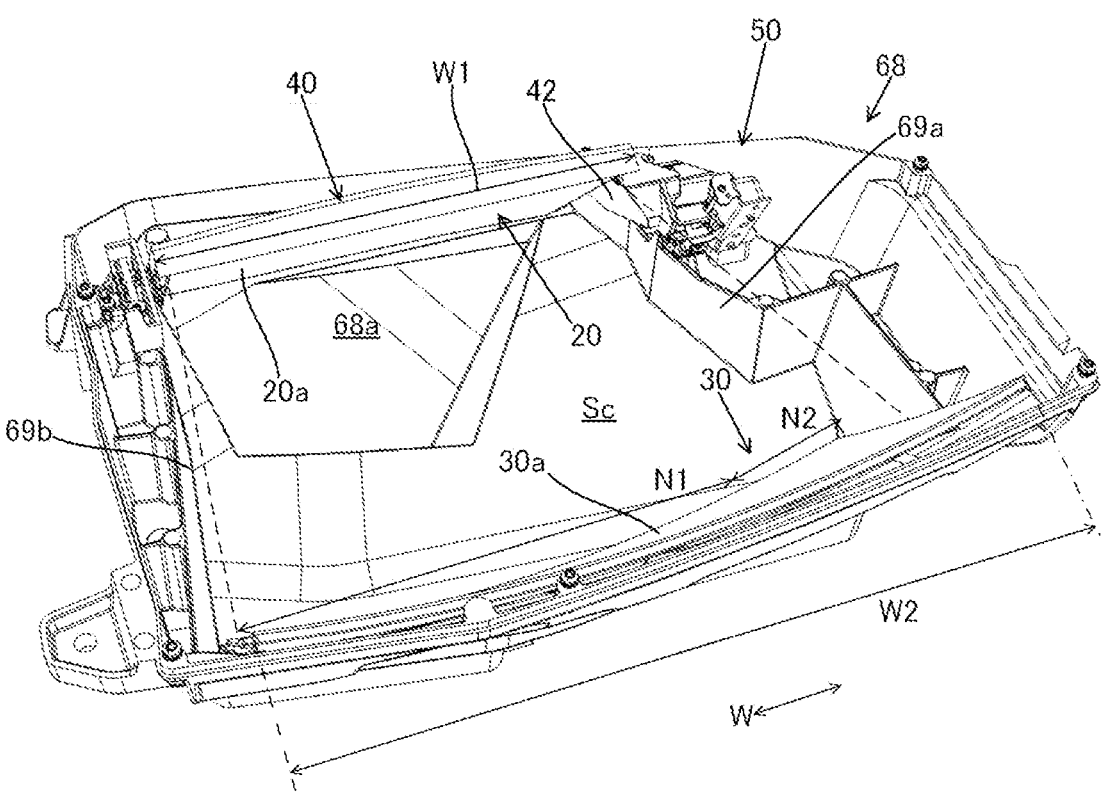
FIG. 5 is a perspective view of a head-up display device according to one embodiment of the present disclosure with an upper case removed.

As illustrated in FIG. 5, a width W1 of the first mirror 20 along the width direction W is smaller than a width W2 of the second mirror 30 along the width direction W. That is, in the width direction W, the reflecting surface 20*a* of the first mirror 20 faces a first range N1 of a reflecting surface 30*a* of the second mirror 30, and the mirror driving unit 50 faces a rest portion, that is, a second range N2, of the reflecting surface 30*a* of the second mirror 30.

As illustrated in FIG. 4, a height H1 of the first mirror 20 is smaller than a height H2 of the second mirror 30.

A curvature of the first mirror 20 is smaller than that of the second mirror 30. Furthermore, the first mirror 20 causes the reflected display light L to reach the second mirror 30 while expanding the reflected display light L in the width direction W.

As illustrated in FIG. 2, the mirror holder unit 40 rotatably supports the first mirror 20 around the rotation axis Ax. A specific configuration of the mirror holder unit 40 will be described later.

The mirror driving unit 50 rotates the mirror holder unit 40 together with the first mirror 20 around the rotation axis Ax under control by the control board 70. A specific configuration of the mirror driving unit 50 will be also described later.

As illustrated in FIG. 2, the second mirror 30 reflects the display light L reflected by the first mirror 20 while expanding the display light L toward the windshield 6 (see FIG. 1). The second mirror 30 is unrotatably fixed in the housing 60.

The control board 70 acquires vehicle information from outside and controls the display unit 10 and the mirror driving unit 50, based on the acquired vehicle information. The control board 70 is a printed circuit board on which various electronic components, such as a central processing unit (CPU), a graphics display controller (GDC), read only memory (ROM), random access memory (RAM), or the like, are mounted.

As illustrated in FIG. 2, the housing 60 is formed of a light-shielding material, such as resin or the like, into a box shape. Various components of the head-up display device 100 are housed in the housing 60.

For further detail, the housing 60 includes an upper case 61, a lower case 68, and a cover 67.

The lower case 68 has a box shape that is opened upward. The control board 70 and the display unit 10 are attached to an outer bottom surface of the lower case 68. The cover 67 is attached to the outer bottom surface of the lower case 68 to cover the control board 70. A light passing hole 68*a* through which the display light L emitted by the display unit 10 passes is formed in an inner bottom surface of the lower case 68.

As illustrated in FIG. 4, the mirror holder unit 40 that supports the first mirror 20, the second mirror 30, and the mirror driving unit 50 are housed in the lower case 68. A light path Sc through which the display light L passes is formed between the first mirror 20 and the second mirror 30 in the lower case 68. In the lower case 68, side wall portions 69*a* and 69*b* facing each other in the width direction W through the light path Sc are formed.

As illustrated in FIG. 2, the upper case 61 functions as a lid of the lower case 68 so as to close an opening of the lower case 68. An opening portion 61*h* is formed in a position opposite to the windshield 6 (see FIG. 1) in the upper case 61. The upper case 61 includes a curved plate-shaped window portion 65 that closes the opening portion 61*h*. The window portion 65 is formed of a translucent member, such as acrylic resin or the like, through which the display light L is transmitted.

Next, a specific configuration of the mirror holder unit 40 will be described.

Figure 6:
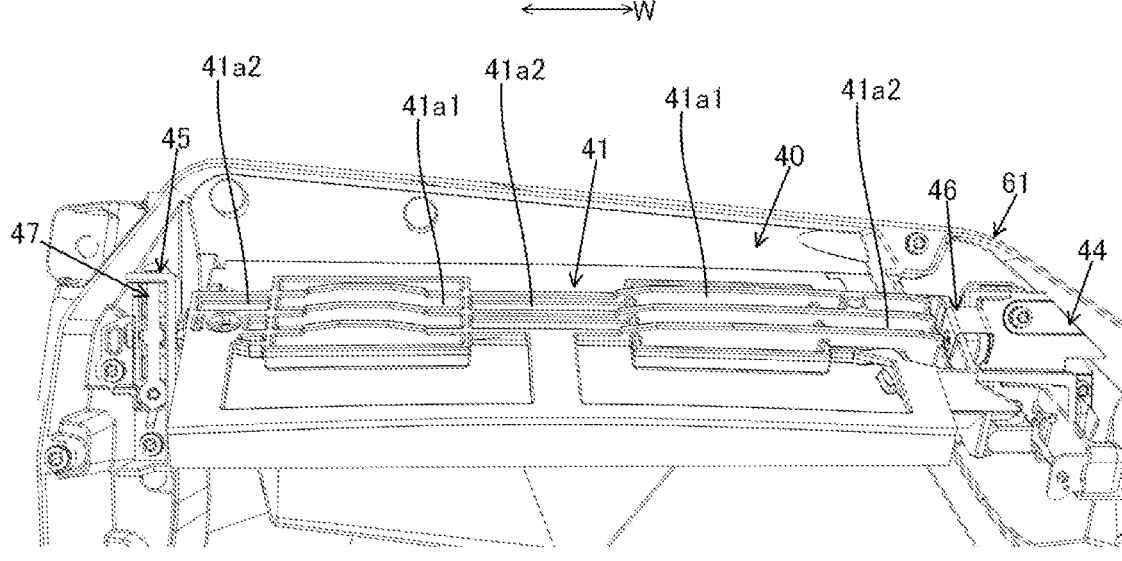
FIG. 6 is an enlarged perspective view of a portion of the head-up display device according to one embodiment of the present disclosure with an upper case removed.

As illustrated in FIG. 6, the mirror holder unit 40 includes a mirror holder 41, a first shaft support member 44, a second shaft support member 45, and fixing members 46 and 47.

Figure 7:
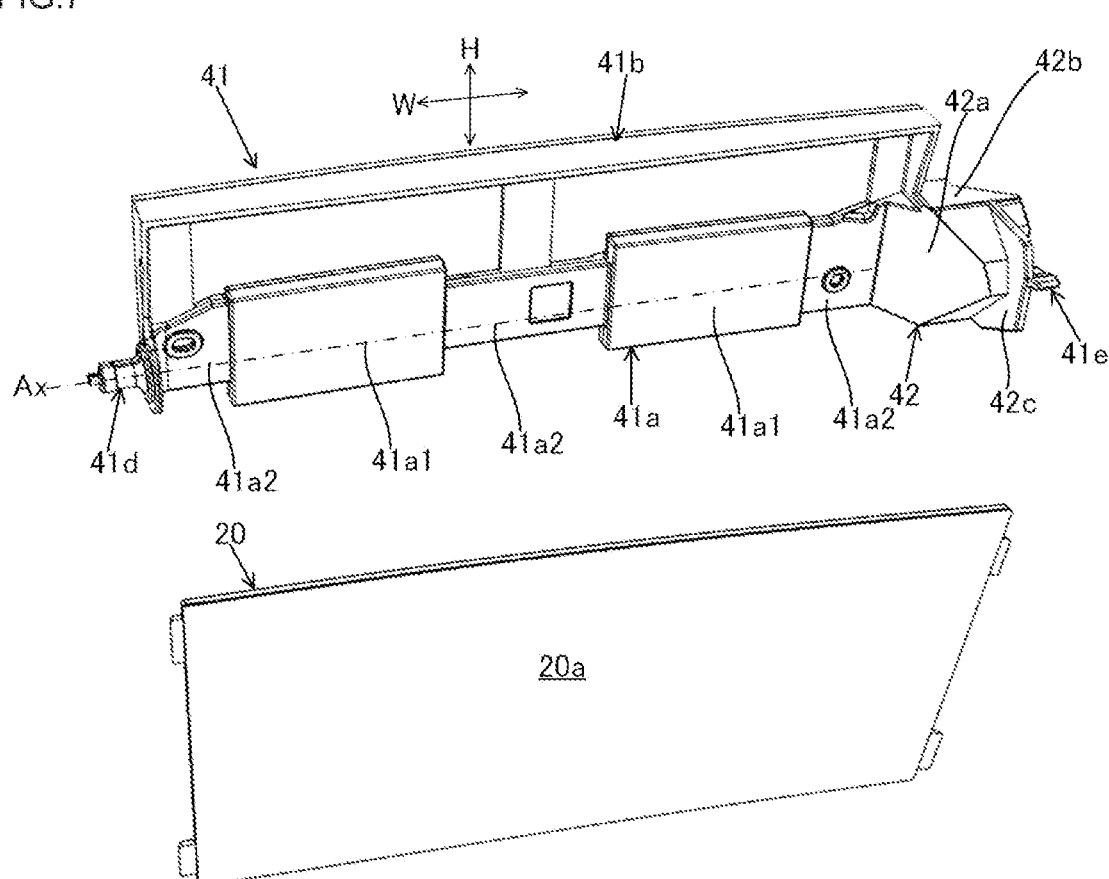
FIG. 7 is an exploded perspective view of a first mirror and a mirror holder according to one embodiment of the present disclosure.
Figure 11:
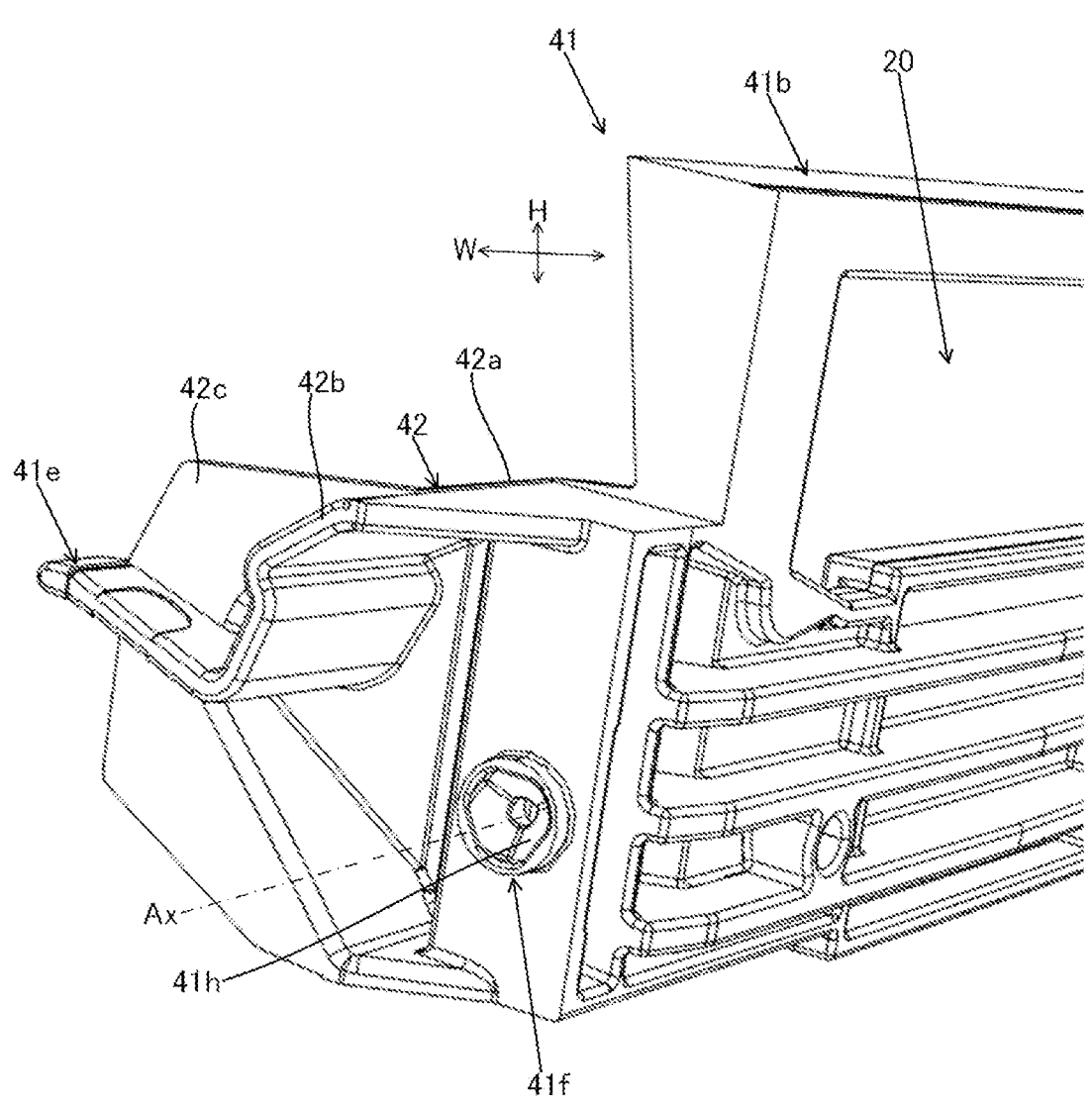
FIG. 11 is a perspective view of a first mirror and a mirror holder according to one embodiment of the present disclosure.

As illustrated in FIG. 7, the mirror holder 41 includes a mirror support portion 41*a*, a cover portion 41*b*, a light shielding wall portion 42, a shaft portion 41*d*, and a gripped portion 41*e*, and also includes a shaft portion 41*f*, as illustrated in FIG. 11.

As illustrated in FIG. 7, the mirror support portion 41*a* supports the first mirror 20 from a back surface of the first mirror 20 at an opposite side to the reflecting surface 20*a*. The mirror support portion 41*a* extends along the width direction W and has an approximately rectangular plate shape that is long in the width direction W. The mirror support portion 41*a* includes a plurality of contact portions 41*a*1 and a plurality of coupling portions 41*a*2. Each of the contact portion 41*a*1 has a rectangular plate shape. The plurality of contact portions 41*al*, that is, in this example, two contact portions 41*al*, are aligned in the width direction W and are adhered to the back surface of the first mirror 20 via an adhesive tool, such as an adhesive, a double-sided tape, or the like. Each of the coupling portion 41*a*2 is separated from the back surface of the first mirror 20 and couples the shaft portion 41*d*, each of the contact portions 41*a*1, and the light shielding wall portion 42.

Figure 8:
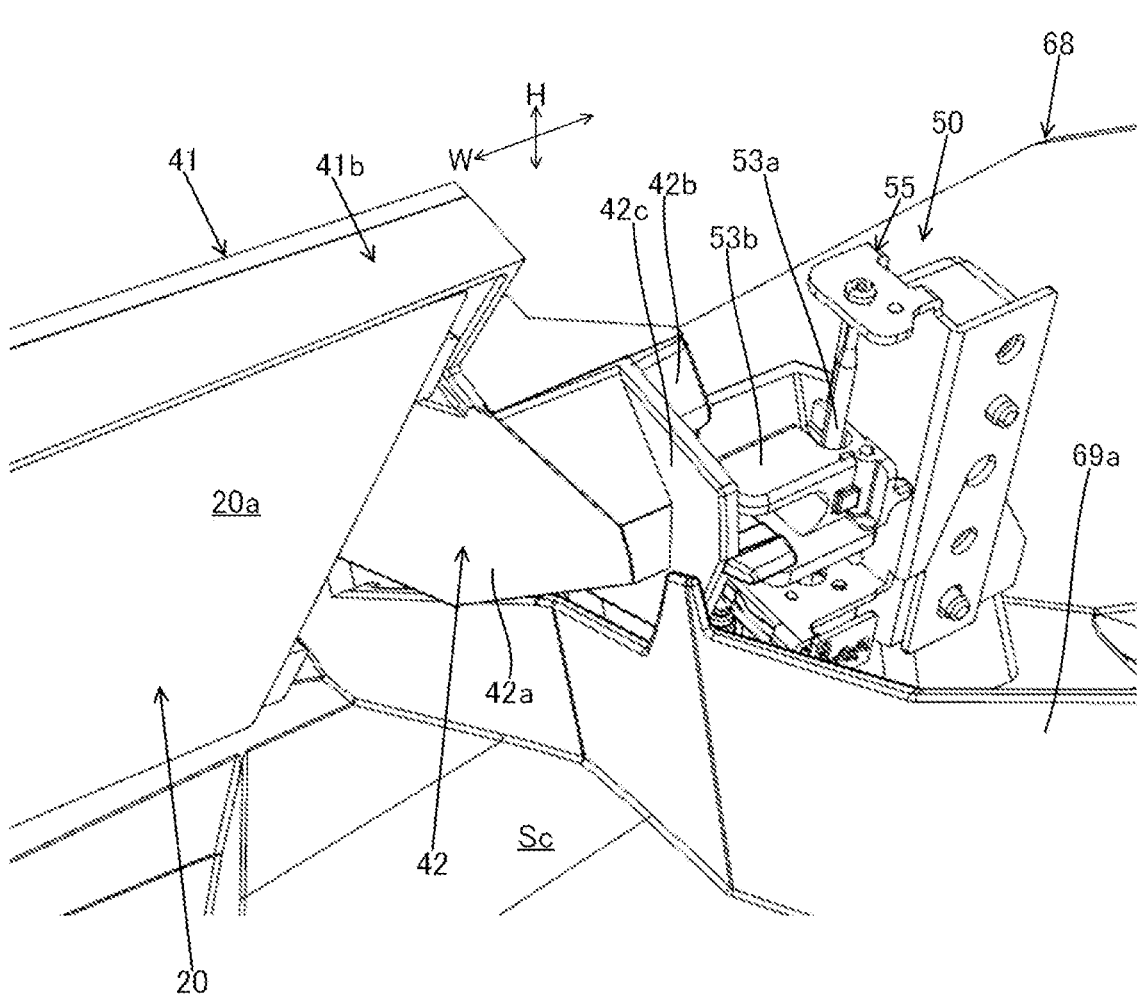
FIG. 8 is an enlarged perspective view of a portion of the head-up display device according to one embodiment of the present disclosure with an upper case removed.

As illustrated in FIG. 7 and FIG. 8, the cover portion 41*b* is formed to cover at least an edge portion of an upper side surface of the first mirror 20. The edge portion is a corner portion between the reflecting surface 20*a* of the first mirror 20 and the upper side surface of the first mirror 20. The cover portion 41*b* has a rectangular plate shape that is long in the width direction W and faces the upper side surface of the first mirror 20.

Figure 13:
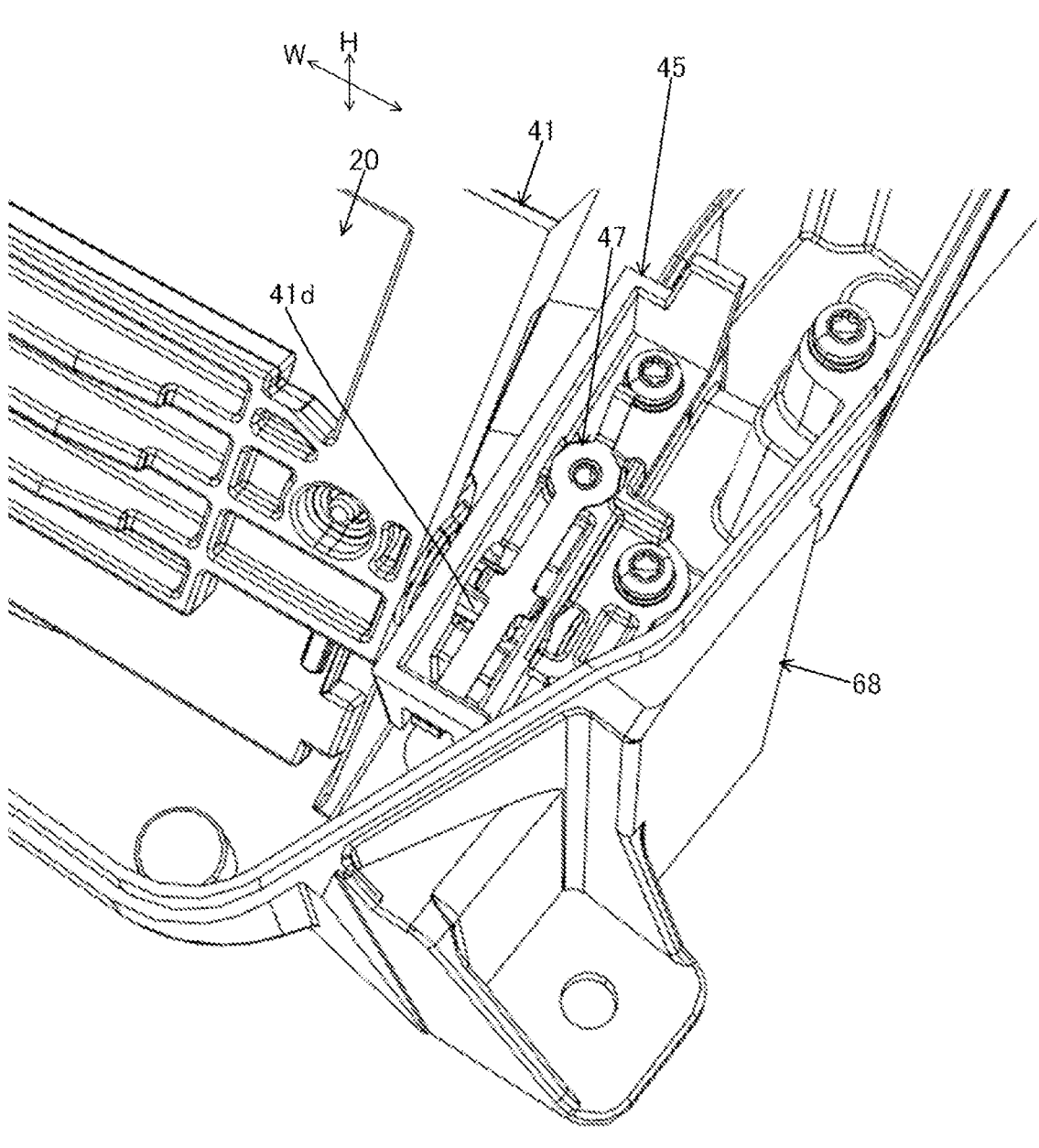
FIG. 13 is an enlarged perspective view of a portion of a head-up display device according to one embodiment of the present disclosure with an upper case removed.

As illustrated in FIG. 7, the shaft portion 41*d* is located at a first end portion (left end portion in FIG. 7) along the rotation axis Ax of the mirror holder 41 and has an approximately cylindrical shape extending along the rotation axis Ax. As illustrated in FIG. 13, the shaft portion 41*d* is supported so as to be axially rotatable by the second shaft support member 45.

Figure 12:
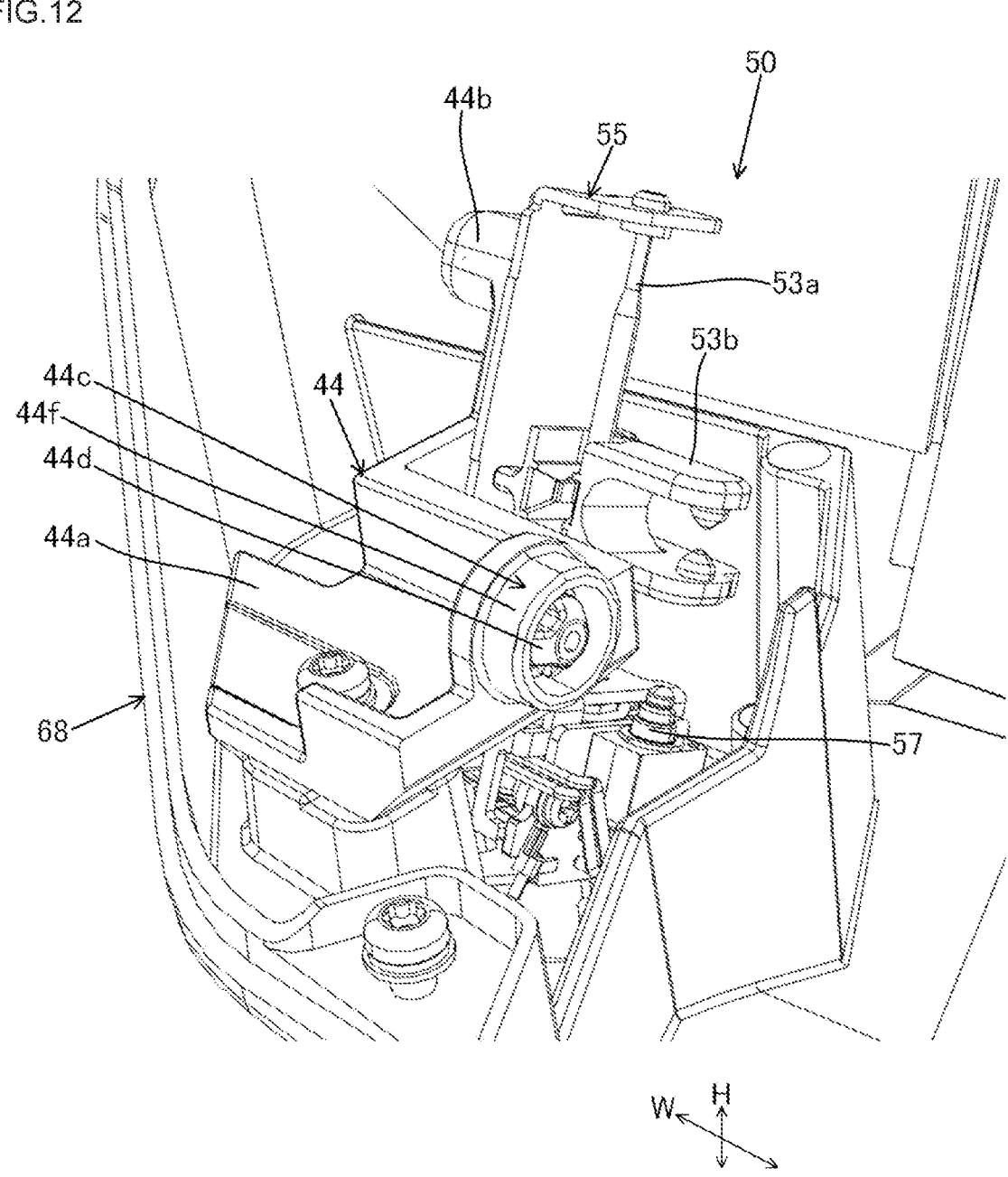
FIG. 12 is a perspective view of a mirror driving unit and a first shaft support member according to one embodiment of the present disclosure.

As illustrated in FIG. 11, the shaft portion 41*f* is located in a second end portion at an opposite side to the first end portion along the rotation axis Ax of the mirror holder 41 and is supported so as to be axially rotatable by the first shaft support member 44 (see FIG. 12). The shaft portion 41*f* has a receiving hole 41*h* having an approximately triangular pyramid shape. A spherical portion 44*d* of the first shaft support member 44, which will be described later, contacts each inner surface of the receiving hole 41*h*. With the spherical portion 44*d* contacting each inner surface of the receiving hole 41*h*, the shaft portion 41*f* is supported so as to be rotatable around the rotation axis Ax by the first shaft support member 44.

As illustrated in FIG. 8, the light shielding wall portion 42 is located between the light path Sc through which the display light L passes and the mirror driving unit 50 and shields sunlight or the display light L from the light path Sc toward the mirror driving unit 50. The light shielding wall portion 42 prevents the mirror driving unit 50 from being illuminated by sunlight or the display light L. As illustrated in FIG. 5, the light shielding wall portion 42 is located above a portion of the side wall portion 69a of the lower case 68 located close to the first mirror 20.

Figure 9:
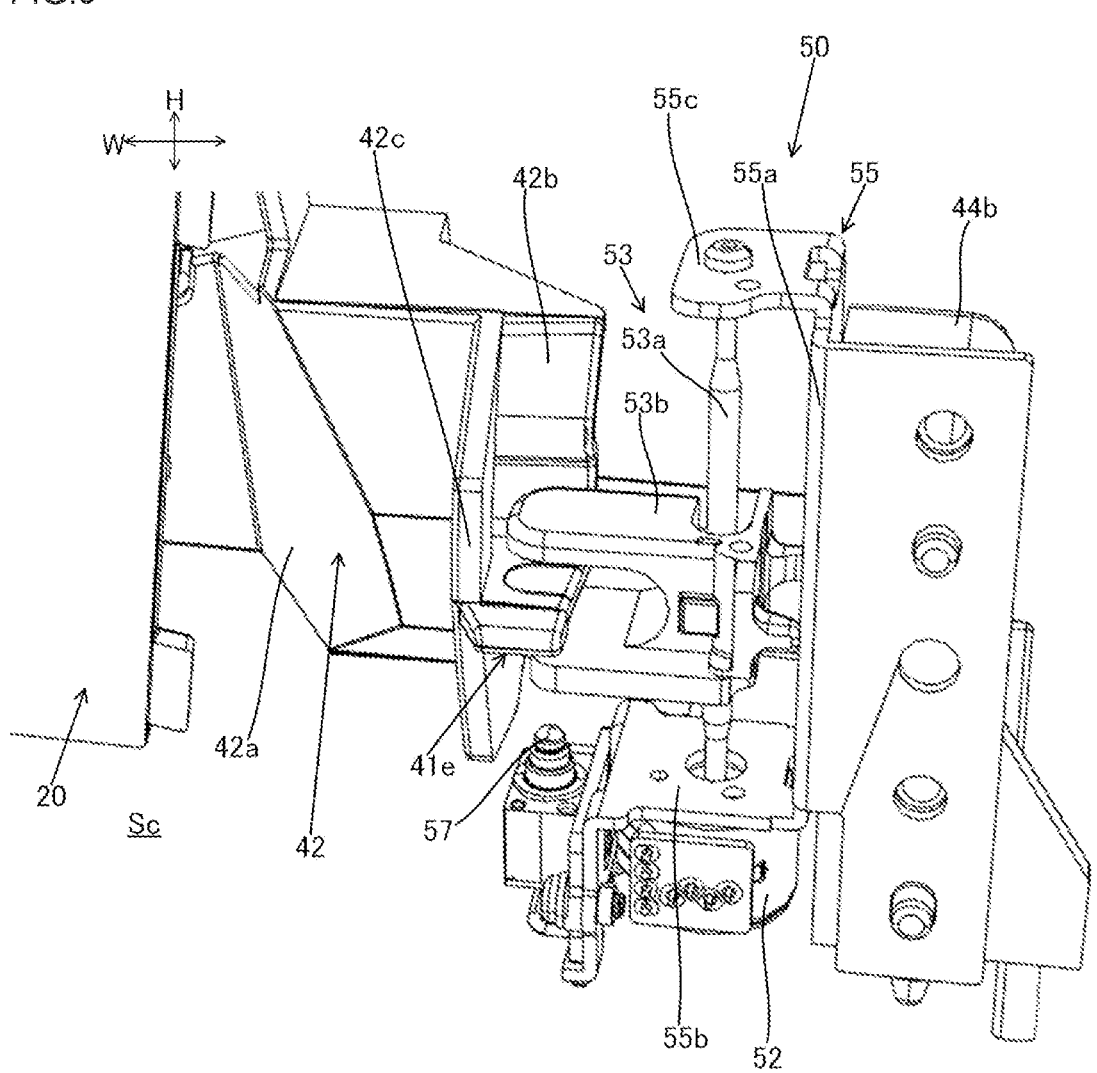
FIG. 9 is a perspective view of a mirror driving unit and a mirror holder according to one embodiment of the present disclosure.

As illustrated in FIG. 9, the light shielding wall portion 42 includes a first plate portion 42a, a second plate portion 42b, and a third plate portion 42c.

The first plate portion 42a is inclined along light expansion of the display light L reflected at the first mirror 20. The first plate portion 42a is coupled to the second end portion of the mirror support portion 41a (right end portion in FIG. 7) and extends along a light emission direction and a light expansion direction of the display light L reflected at the first mirror 20. As illustrated in FIG. 8, the first plate portion 42a is located more inside in the width direction W than the side wall portion 69a of the lower case 68.

Figure 10:
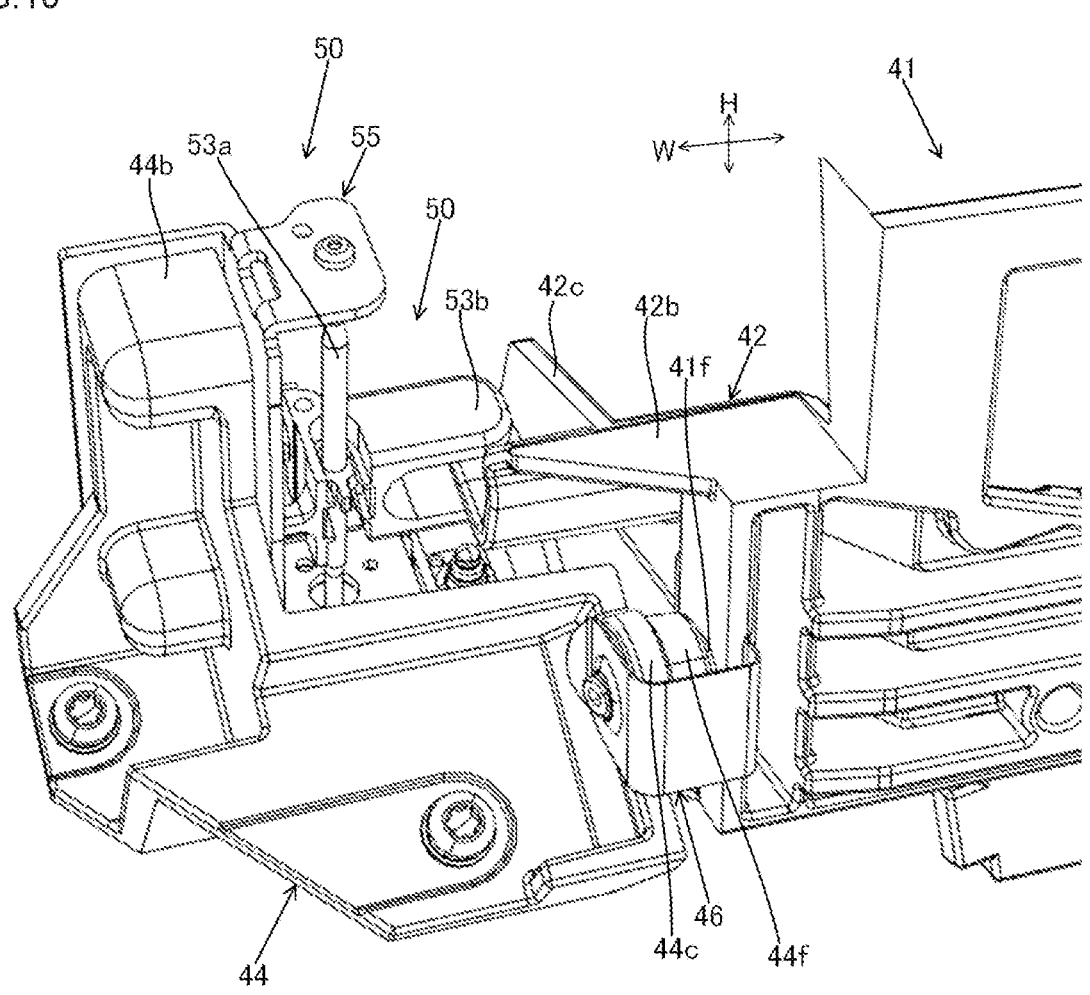
FIG. 10 is a perspective view of a mirror driving unit and a mirror holder according to one embodiment of the present disclosure.

As illustrated in FIG. 10, the second plate portion 42b surrounds the shaft portion 41f from above. The second plate portion 42b is formed on a back surface of the first plate portion 42a at an opposite side to the light path Sc.

As illustrated in FIG. 9, the third plate portion 42c is formed to hide the gripped portion 41e from the light path Sc. The third plate portion 42c extends in a direction intersecting the width direction W, is located at a position more distant from the mirror holder 41 than the first plate portion 42a, and is located more outside in the width direction W than the first plate portion 42a. As illustrated in FIG. 8, the third plate portion 42c is located more outside in the width direction W than the side wall portion 69a of the lower case 68.

As illustrated in FIG. 12, the first shaft support member 44 includes a fixed portion 44a, a holding member support portion 44b, and a shaft support portion 44c.

The fixed portion 44a is fixed in the lower case 68.

The holding member support portion 44b extends upward from the fixed portion 44a to support the holding member 55 of the mirror driving unit 50, which will be described later.

The shaft support portion 44c supports the shaft portion 41d so that the mirror holder 41 is rotatable around the rotation axis Ax. The shaft support portion 44c includes the spherical portion 44d that contacts the receiving hole 41h (see FIG. 11) of the shaft portion 41f and a cylindrical portion 44f located around outer peripheries of the spherical portion 44d and the shaft portion 41f. The spherical portion 44d is integrally formed as a portion of the first shaft support member 44. Thus, the number of parts can be reduced, as compared to a case where the spherical portion 44d is formed as a separate body. The spherical portion 44d is formed in an approximately hemispherical shape. In this example, the spherical portion 44d has an approximately hemispherical shape with three divided portions in a rotational direction around the rotation axis Ax, and each of the three divided portions contacts a corresponding one of surfaces of the receiving hole 41h having an approximately triangular pyramid shape. Thus, the shaft portion 41f is supported by the shaft support portion 44c. The shaft support portion 44c is formed to have a hemispherical shape, and thus, it is possible to prevent the shaft support portion 44c from being worn as the mirror holder 41 rotates around the rotation axis Ax.

As illustrated in FIG. 10, the fixing member 46 fixes the shaft support portion 44c and the shaft portion 41f such that the shaft support portion 44c and the shaft portion 41f are relatively rotatable around the rotation axis Ax in a state where the shaft portion 41f is supported by the shaft support portion 44c. The fixing member 46 is formed as a metal clip having an approximately U shape and clamps the shaft support portion 44c and the shaft portion 41f from outside.

As illustrated in FIG. 13, the second shaft support member 45 is fixed in the lower case 68 and supports the shaft portion 41d from below such that the shaft portion 41d is rotatable around the rotation axis Ax. The fixing member 47 is a metal plate and presses the shaft portion 41d toward the second shaft support member 45 from above.

Next, a specific configuration of the mirror driving unit 50 will be described.

As illustrated in FIG. 9, the mirror driving unit 50 includes a motor 52, a conversion mechanism 53 that converts rotational motion of the motor 52 into linear motion, a holding member 55 that holds the motor 52 and the conversion mechanism 53, and a position detection unit 57.

The conversion mechanism 53 includes a lead screw 53a and a slider 53b. The holding member 55 is fixed to the holding member support portion 44b of the first shaft support member 44 and rotatably holds the lead screw 53a, and the motor 52 is attached to the holding member 55. For example, the holding member 55 includes a first plate portion 55a, a second plate portion 55b extending from a lower end of the first plate portion 55a in a direction orthogonal to the first plate portion 55a, and a third plate portion 55c extending from an upper end of the first plate portion 55a in the same direction as the second plate portion 55b. The lead screw 53a extending in a bar shape along the height direction H is rotatably supported between the second plate portion 55b and the third plate portion 55c. An outer circumference of the lead screw 53a is threaded.

The motor 52 is fixed to a lower surface of the second plate portion 55b. The motor 52 is driven by control by the control board 70 to axially rotate the lead screw 53a.

The slider 53b has a shape to clamp the gripped portion 41e of the mirror holder 41. The slider 53b is engaged with the outer circumference of the lead screw 53a and moves along the axial direction of the lead screw 53a as the lead screw 53a axially rotates. When the slider 53b moves along the axial direction of the lead screw 53a (the height direction H), the mirror holder 41 rotates together with the first mirror 20 around the rotation axis Ax via the gripped portion 41e. A rotation angle of the mirror holder 41 and the first mirror 20 around the rotation axis Ax is set to 10 degrees to 20 degrees, for example, 15 degrees.

The position detection unit 57 detects, for example, that the slider 53b has reached a lower end portion of the lead screw 53a (end portion at a motor 52 side) and outputs the detection result to the control board 70. The position detection unit 57 is formed of a push switch that is pressed by the slider 53b.

Next, an action of the head-up display device 100 will be described.

The mirror holder 41 is caused to rotate together with the first mirror 20 around the rotation axis Ax by the mirror driving unit 50 under control by the control board 70. When the first mirror 20 rotates around the rotation axis Ax, an irradiation range Ar (see FIG. 4) on the reflecting surface 30a of the second mirror 30 in the display light L reflected by the first mirror 20 moves in the height direction H. Thus, an irradiation position of the display light L to the viewer 1 moves in the height direction H.

Advantageous Effects

According to the embodiment described above, the following advantageous effects are achieved.

(1) The head-up display device 100 includes the display unit 10 that emits the display light L, the first mirror 20 that reflects the display light L from the display unit 10, the second mirror 30 that reflects the display light L reflected at the first mirror 20, and the mirror driving unit 50 that rotates the first mirror 20 around the rotation axis Ax.

According to this configuration, of two mirrors, that is, the first mirror 20 and the second mirror 30, the first mirror 20 on a front side is rotatable around the rotation axis Ax. Thus, the display light L reaches the first mirror 20 that is a rotation mirror before the display light L expands, so that a size of the first mirror 20 that is a rotation mirror can be reduced. Accordingly, only small force is required to rotate the first mirror 20, so that a size of the mirror driving unit 50 can be reduced. Therefore, reduction in size of the head-up display device 100 can be achieved.

(2) The head-up display device 100 includes the mirror holder 41 that supports the first mirror 20. The mirror holder 41 includes the cover portion 41*b* that is formed to cover the upper side surface of the first mirror 20.

According to this configuration, it is possible to prevent sunlight or the display light L from reaching an upper end of the first mirror 20 and becoming stray light. Thus, generation of stray light can be suppressed and display quality of the virtual image V can be increased.

In particular, light tends to gather in edges of the first mirror 20, and therefore, it is desirable that the edges are hidden by the cover portion 41*b*.

(3) The head-up display device 100 includes the mirror holder 41 that supports the first mirror 20. The mirror holder 41 includes the light shielding wall portion 42 that is formed between the light path Sc through which the display light L passes and the mirror driving unit 50 in the head-up display device 100 and hides the mirror driving unit 50 from the light path Sc.

According to this configuration, the light shielding wall portion 42 prevents sunlight or the display light L from reaching the mirror driving unit 50. Thus, generation of stray light can be suppressed and display quality of the virtual image V can be increased.

(4) The head-up display device 100 includes the mirror holder 41 including the shaft portion 41*f* located at an end of the first mirror 20 in a direction along the rotation axis Ax of the first mirror 20 and supports the first mirror 20 and the first shaft support member 44 that is an example of a shaft support portion that rotatably supports the shaft portion 41*f*. The spherical portion 44*d* is formed in the first shaft support member 44 and the receiving hole 41*h* that the spherical portion 44*d* enters is formed in the shaft portion 41*f*.

According to this configuration, friction or wear between the mirror holder 41 and the first shaft support member 44 caused as the mirror holder 41 rotates can be reduced.

(5) The first mirror 20 is a concave mirror, and the width W1 of the first mirror 20 in the direction along the rotation axis Ax is smaller than the width W2 of the second mirror 30 in the direction along the rotation axis Ax.

According to this configuration, the size of the first mirror 20 can be reduced.

(6) The first mirror 20 is positioned to face the first range N1 that is a portion of the second mirror 30. The mirror driving unit 50 is positioned to face the second range N2 that is a rest of the second mirror 30.

According to this configuration, both the first mirror 20 and the mirror driving unit 50 are arranged to face the second mirror 30, so that reduction in size of the head-up display device 100 can be achieved.

The present disclosure is not limited to the embodiment described above and the drawings. Variations (including deletion of components) can be made as appropriate in a range in which the scope of this disclosure is not changed. Examples of variations will be described below.

(Variations)

In the embodiment described above, the head-up display device 100 includes two mirrors (the first mirror 20 and the second mirror 30), but the number of mirrors is not limited thereto and can be three or more. For example, when the head-up display device 100 includes three mirrors, the head-up display device 100 is configured such that, of the three mirrors, a mirror in a front side located closest to the display unit 10 in a light path of the display light L or a middle mirror located at a midpoint of the light path is rotatable.

In the embodiment described above, the first shaft support member 44 and the second shaft support member 45 are formed as separate bodies from the lower case 68, but the first shaft support member 44 and the second shaft support member 45 are not limited thereto and may be integrally formed with the lower case 68.

In the embodiment described above, the light shielding wall portion 42 may be omitted.

In the embodiment described above, the spherical portion 44*d* is formed in the first shaft support member 44 and the receiving hole 41*h* that the spherical portion 44*d* enters is formed in the shaft portion 41*f*, but the spherical portion 44*d* and the receiving hole 41*h* are not limited thereto, the spherical portion 44*d* may be formed in the shaft portion 41*f*, and the receiving hole 41*h* that the spherical portion 44*d* enters may be formed in the first shaft support member 44.

In the embodiment described above, the shaft portion 41*f* has the receiving hole 41*h* and the receiving hole 41*h* is formed such that the spherical portion 44*d* of the first shaft support member 44 fits the receiving hole 41*h*, but the shaft portion 41*f* and the first shaft support member 44 are not limited thereto and may be formed in a similar manner to the shaft portion 41*d* and the second shaft support member 45.

In the embodiment described above, the head-up display device 100 emits the display light L toward the windshield 6 that is an example of the projection target member, but may be configured to emit the display light L toward a dedicated combiner as an example of the projection target member.

The head-up display device 100 may be mounted in some other vehicle than the vehicle 5.

DESCRIPTION OF REFERENCE NUMERALS

1 Viewer
5 Vehicle
6 Windshield
10 Display unit
20 First mirror
20*a* Reflecting surface
30 Second mirror
30*a* Reflecting surface
40 Mirror holder unit
41 Mirror holder
41*a* Mirror support portion
41*b* Cover portion
41*a*1 Contact portion
41*a*2 Coupling portion
41*d*, 41*f* Shaft portion
41*e* Gripped portion
41*h* Receiving hole
42 Light shielding wall portion
42*a* First plate portion
42*b* Second plate portion

42*c* Third plate portion
44 First shaft support member
44*a* Fixing portion
44*b* Holding member support portion
44*c* Shaft support portion
44*d* Spherical portion
45 Second shaft support member
46, 47 Fixing member
50 Mirror driving unit
52 Motor
53 Conversion mechanism
53*a* Lead screw
53*b* Slider
55 Holding member
55*a* First plate portion
55*b* Second plate portion
55*c* Third plate portion
57 Position detection unit
70 Housing
61 Upper case
61*h* Opening portion
65 Window portion
67 Cover
68 Lower case
68*a* Light passing hole
69*a*, 69*b* Side wall portion
70 Control board
100 Head-up display device
H Height direction
L Display light
N1 First range
N2 Second range
V Virtual image
W Width direction
Ar Irradiation range
Sc Light path
Ax Rotation axis

The invention claimed is:

1. A head-up display device comprising:
a display unit that emits display light;
a first mirror that reflects the display light from the display unit;
a second mirror that reflects the display light reflected at the first mirror;
a mirror holder that supports the first mirror; and
a mirror driving unit that rotates the mirror holder together with the first mirror around a rotation axis,
wherein the mirror holder includes a light shielding wall portion that is formed between a light path through which the display light passes and the mirror driving unit in the head-up display device and hides the mirror driving unit from the light path, and
wherein the first mirror, the light shielding wall portion, and the mirror driving unit are arranged along the rotation axis such that the first mirror is located on a first side of the light shielding wall portion and the mirror driving unit is located on a second side of the light shielding wall portion, the second side being opposite the first side.

2. The head-up display device according to claim 1, further comprising:
a shaft support portion,
wherein the mirror holder further includes a shaft portion rotatably supported by the shaft support portion and located at an end portion of the first mirror in the direction along the rotation axis,
wherein a spherical portion is formed in one of the shaft portion and the shaft support portion, and
wherein a receiving hole that the spherical portion enters is formed in the other of the shaft portion and the shaft support portion.

3. The head-up display device according to claim 1,
wherein the first mirror is a concave mirror, and
wherein a width of the first mirror in the direction along the rotation axis is smaller than a width of the second mirror in the direction along the rotation axis.

4. The head-up display device according to claim 3,
wherein the first mirror is positioned to face a portion of the second mirror, and
wherein the mirror driving unit is positioned to face a rest portion of the second mirror.

5. The head-up display device according to claim 1,
wherein the light shielding wall portion includes a first plate portion extending along a light emission direction of the display light reflected at the first mirror.

6. The head-up display device according to claim 5,
wherein the first mirror is a concave mirror concavely curved in the direction along the rotation axis, and
wherein the first plate portion also extends along a light expansion direction of the display light reflected at the first mirror.

7. The head-up display device according to claim 5,
wherein the mirror holder includes a shaft portion located in an end portion of the mirror holder along the rotation axis, and
wherein the light shielding wall portion includes a second plate portion surrounding the shaft portion from above and formed on a back surface of the first plate portion at a side opposite to the light path.

8. The head-up display device according to claim 1,
wherein the mirror holder includes a gripped portion configured to be gripped by the mirror driving unit, and
wherein the light shielding wall portion includes a third plate portion formed to hide the gripped portion from the light path and extending in a direction intersecting with a width direction of the first mirror.

* * * * *